Figure 1:
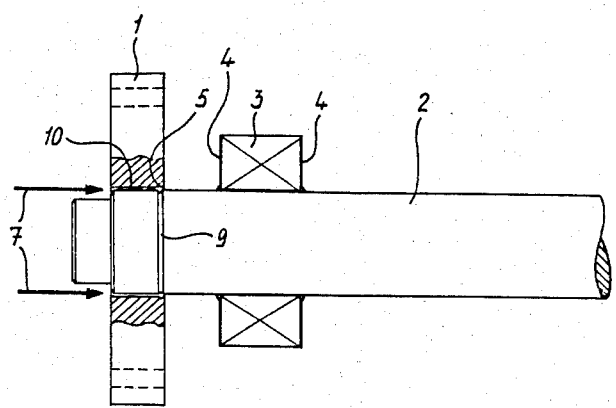

United States Patent [19]

Verburgh et al.

[11] Patent Number: 4,691,092

[45] Date of Patent: Sep. 1, 1987

[54] METHOD FOR WELDING TWO PARTS TOGETHER EMPLOYING A CONCENTRATED ENERGY BEAM AND PROTECTIVE MEMBER

[75] Inventors: Martin B. Verburgh, Amersfoort, Netherlands; Dieter Pfeifle, Filderstadt, Fed. Rep. of Germany

[73] Assignee: SKF Industrial Trading and Development Company B.V., Nieuwegein, Netherlands

[21] Appl. No.: 803,201

[22] Filed: Nov. 27, 1985

[30] Foreign Application Priority Data

Dec. 7, 1984 [NL] Netherlands ..................... 8403735

[51] Int. Cl.⁴ .............................................. B23K 26/00
[52] U.S. Cl. ....................... 219/121 LD; 219/121 LC; 219/121 LM; 228/50
[58] Field of Search ................ 219/121 EC, 121 ED, 219/121 EM, 121 LM, 121 LC, 121 LD, 121 PK, 137 R; 228/8, 50

[56] References Cited

U.S. PATENT DOCUMENTS

| | | | |
|---|---|---|---|
| 4,063,062 | 12/1977 | Kuhnen | 219/121 ED |
| 4,341,943 | 7/1982 | Nilsen | 219/121 LD |
| 4,376,886 | 3/1983 | Sciaky et al. | 219/121 ED |
| 4,553,015 | 11/1985 | Ishii et al. | 219/121 ED |

Primary Examiner—M. H. Paschall
Attorney, Agent, or Firm—Rosen, Dainow & Jacobs

[57] ABSTRACT

Method for welding together two parts, wherein a concentrated beam of energy causing melting of the parts is directed into the gap extending continuously between two parts, and wherein before welding, at the side facing the side where the beam first strikes the parts, a protective member preventing further passage of the beam of energy is permanently fitted.

5 Claims, 3 Drawing Figures

METHOD FOR WELDING TWO PARTS TOGETHER EMPLOYING A CONCENTRATED ENERGY BEAM AND PROTECTIVE MEMBER

BACKGROUND OF THE INVENTION

The invention relates to a method for welding together two parts, wherein a concentrated beam of energy causing melting of the parts is directed into the gap extending continuously between the two parts.

Such a method is known in the state of the art and is used to weld together parts which are first slipped on to one another by, for example, a beam of electrons. This beam of electrons heats the material found on either side of the gap, which welds together by melting. This method has the disadvantage that not only is the material adjacent to the gap heated to a high temperature, but so is that found beyond the material in the length of the gap. In many cases damage may be caused by this, owing to which this method cannot be utilized. This despite the fact that such a method has important advantages, such as perfect fusion and requiring no special preliminary processing such as bevelling or accurate tolerance of the parts to be inserted into one another. Thus, it is not possible to weld together a shaft and a flange if, for structural reasons, a ball bearing or sealing ring, for example, must first be fitted on the shaft. One is therefore forced to use fastening techniques demanding accurate tolerances, such as shrinking-on, wherein, moreover, connections which are not very reliable are produced.

Two ways to avoid this disadvantage and make welding with a beam of energy possible are known in the state of the art.

First, the welding zone may be designed such that the remaining portion of the beam leaving the gap is absorbed at a suitably place by one of the parts to be welded together, so that damage to components found on the parts to be welded, such as sealing rings, bearings, etc., is avoided. However, this has the disadvantage that the base of the weld, which normally has faults such as porosity and cracks, comprises a structural part of the assembly. High stresses and defects present in this base may leak to crack formation in the stressed assembly and failure thereof.

A second way to prevent the beam of energy from being carried in further is the use of shields, which during welding are fitted between the exit and the part to be protected. Such shields, however, have only a limited service life and if space is limited, removal of these shields in construction of the fastening for the parts is especially difficult and costly.

SUMMARY OF THE INVENTION

The object of the invention is to avoid the disadvantages described in the known methods and provide reliable protection against further transmission of the beam of energy without adversely influencing the material properties of the parts welded together, where costs remain at an acceptable level while a complicated welding setup may be abandoned.

This object is accomplished in the method described above in that before welding at the side facing the side where the beam first strikes the parts, a protective member preventing further passage of the beam of energy is permanently fitted.

By fitting a separate protective member between the gap and the part to be protected, the base of the weld may be formed between the protective member and one of the parts to be welded. Because this protective member is not a bearing member, structural faults have no adverse influence. Fitting the protective member takes place at the same time as fitting of the part to be protected and constitutes a simple inexpensive procedure.

According to another advantageous embodiment of the method, at least one of the parts at the side facing the side where the beam of energy first strikes the parts is provided with a recess partially accommodating the protective member. By placing the protective member in a recess the protective member need not be slipped over one of the parts to be welded with a very accurate fit, so that the protective member may be produced more inexpensively. It is likewise ensured that the beam of energy does not strike the protective member very near the edge thereof, so that partial transmission of the beam of energy is prevented.

According to an additional advantageous embodiment of the invention, the protective member which is used for the method described above is a split wire. Because a wire is simple to mount and inexpensive to manufacture, a protective member is thus obtained in a particularly simple way.

According to a further advantageous embodiment of the protective member, the protective member is of spring steel. The protective member is thus easy to fit and at the same time provides a close-fitting connection with one of the parts to be joined.

According to another embodiment of the protective member, the ends of the wire overlapping one another are bevelled. Owing to this, there is no risk of partial transmission of the beam of energy in the overlapping region of the ends of the wire either.

BRIEF FIGURE DESCRIPTION

The invention is described in greater detail below with the aid of the drawing, by means of an example. In the drawings FIG. 1 is a cross section of a flange and a shaft which are to be welded together, FIG. 2 is a detail of FIG. 1 in cross section after the weld has been made, and FIG. 3 is a side view of a ring used in accordance with the invention.

DETAILED DISCLOSURE OF THE INVENTION

In FIG. 1 is represented a shaft 2 on which a flange 1 is to be fitted. This shaft 2 may, for example, be of a water pump and before the fitting of flange 1 a bearing 3 provided with a sealing ring 4 must be mounted because it is no longer possible to do this later. Between flange 1 and shaft 2 is found a gap 10. By directing a beam of energy 7, such as, for example, a beam of electrons or a laser beam, into the gap from one side, the surface adjacent to the gap 10 of both flange 1 and the shaft 2 is heated such that melting together thereof takes place. Beam 7, however, travels through gap 10 and if no particular measures were taken, it would strike sealing ring 4, whereupon damage would then ensue. In order to avoid such damage, according to the invention a ring-shaped wire 6 is fitted at the end of the gap. This wire 6 is preferably a split ring of spring steel, so that it may easily be slipped about the shaft and yet provide a good connection. To improve closing, the overlapping ends of the wire may be bevelled as shown in FIG. 3.

Figure 2:
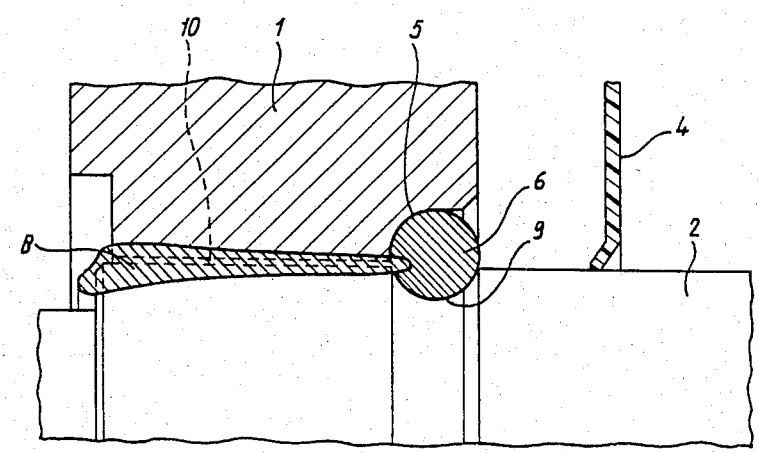
Figure 3:
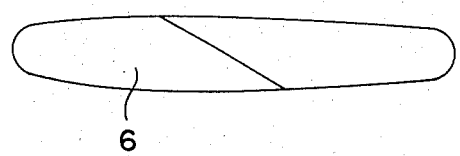

In FIG. 2 the operation of the ring-shaped wire 6 is represented after welding has taken place. Weld 8, which connects together shaft 2 and flange 1, alternatively extends part way into wire 6. By this means the wire is permanently secured, but imperfections which occur preferentially in the end of the weld and consequently in wire 6, have no influence on the mechanical strength of the shaft-flange connection. By optimal selection of the diameter of the wire 6 the latter in addition provides a range of tolerance wherein the weld may extend comparatively far, as circumstances on welding may require. FIG. 2 likewise shows how shaft 2, instead of the wire 6, has a recess 9. A corresponding recess 5 is provided in flange 1. Owing to this the wire 6 in the center is subjected to heat and no risk exists that the beam of energy 7 will pass partially under wire 6 or over wire 6 and sealing ring 4 may still be damaged. Owing to the presence of these recesses wire 6 may be fitted with a greater tolerance because space between ring-shaped wire 6 and flange 1 or shaft 2 does not lead directly to partial transmission of the beam of energy.

Although the invention above is described by means of a shaft-flange connection with use of a wire, it should be understood that the invention is not limited to this embodiment and may be used for other connections in which use is made of protective members shaped differently.

We claim:

1. In the method for welding together first and second parts separated by a gap of extended depth, said gap being open at both ends in the direction of the gap's depth, wherein a concentrated beam of energy in the direction of the gap's depth causing melting of the parts is directed into the gap between the first and second parts, the improvement comprising permanently attaching to at least one said part a protective member at the end of the gap away from the end thereof where the beam first strikes the parts for preventing passage of the beam of energy beyond the gap, the load bearing capability of the formed weld between said parts being unaffected by the presence of said protective member.

2. The method of claim 1, further comprising providing at least one of the parts at the end thereof away from the end where the beam of energy first strikes the parts with a recess partially accommodating the protective member prior to said step of attaching.

3. The method of claim 1, wherein the step of attaching comprises fitting the protective member in the form of a split wire to at least one said part at the end of said gap.

4. The method of claim 2 wherein said step of attaching comprises providing the protective member in the form of a material, for example spring steel, that is easily secured in the recess under spring force.

5. The method of claim 3 wherein said step of attaching comprises provding a wire wherein the ends of the wire overlap one another and are bevelled.

* * * * *